Aug. 5, 1924.
C. P. RUGGLES
BRAKE
Filed May 7, 1923
1,503,561
3 Sheets-Sheet 3
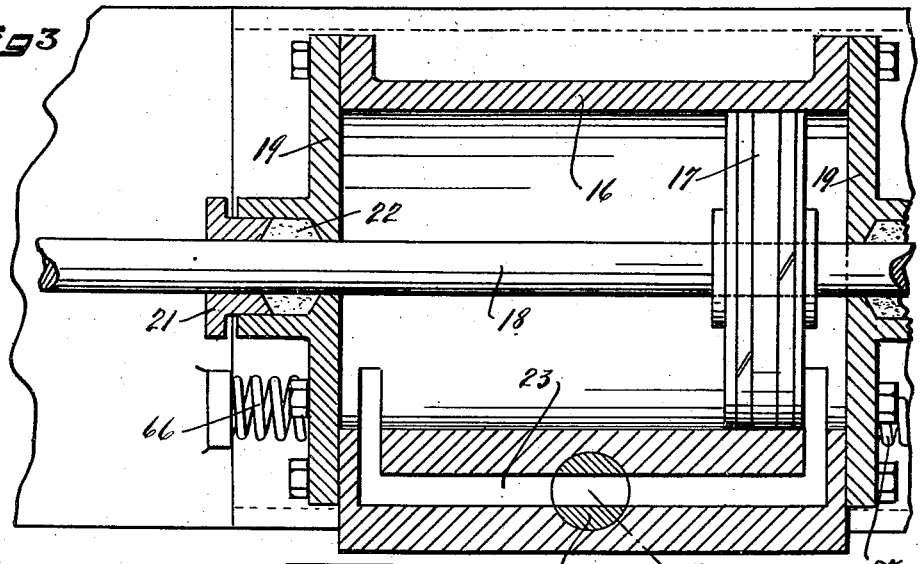
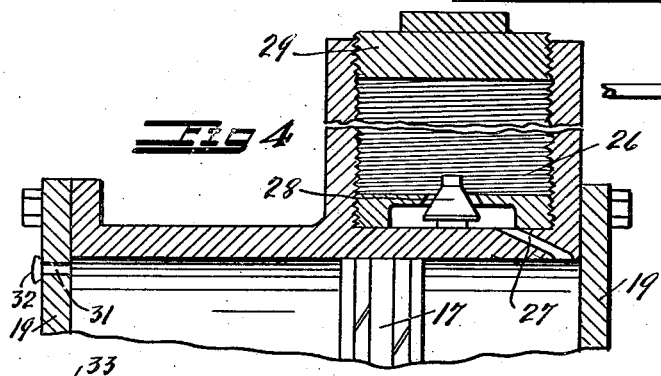
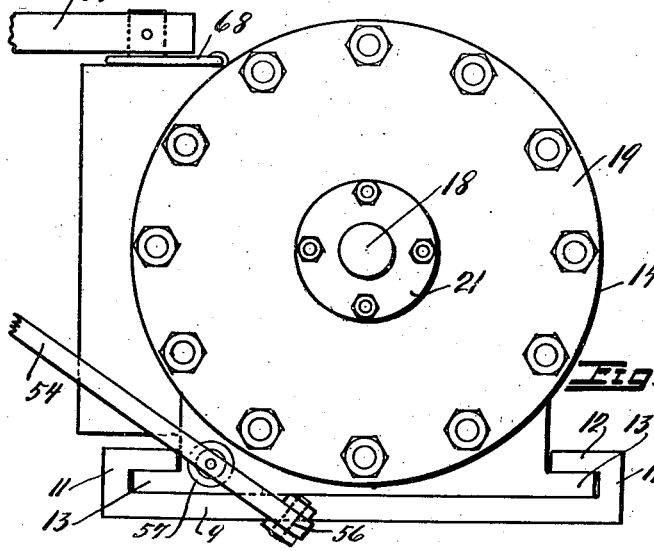
INVENTOR
Clifton P. Ruggles
BY
ATTORNEYS Patented Aug. 5, 1924.

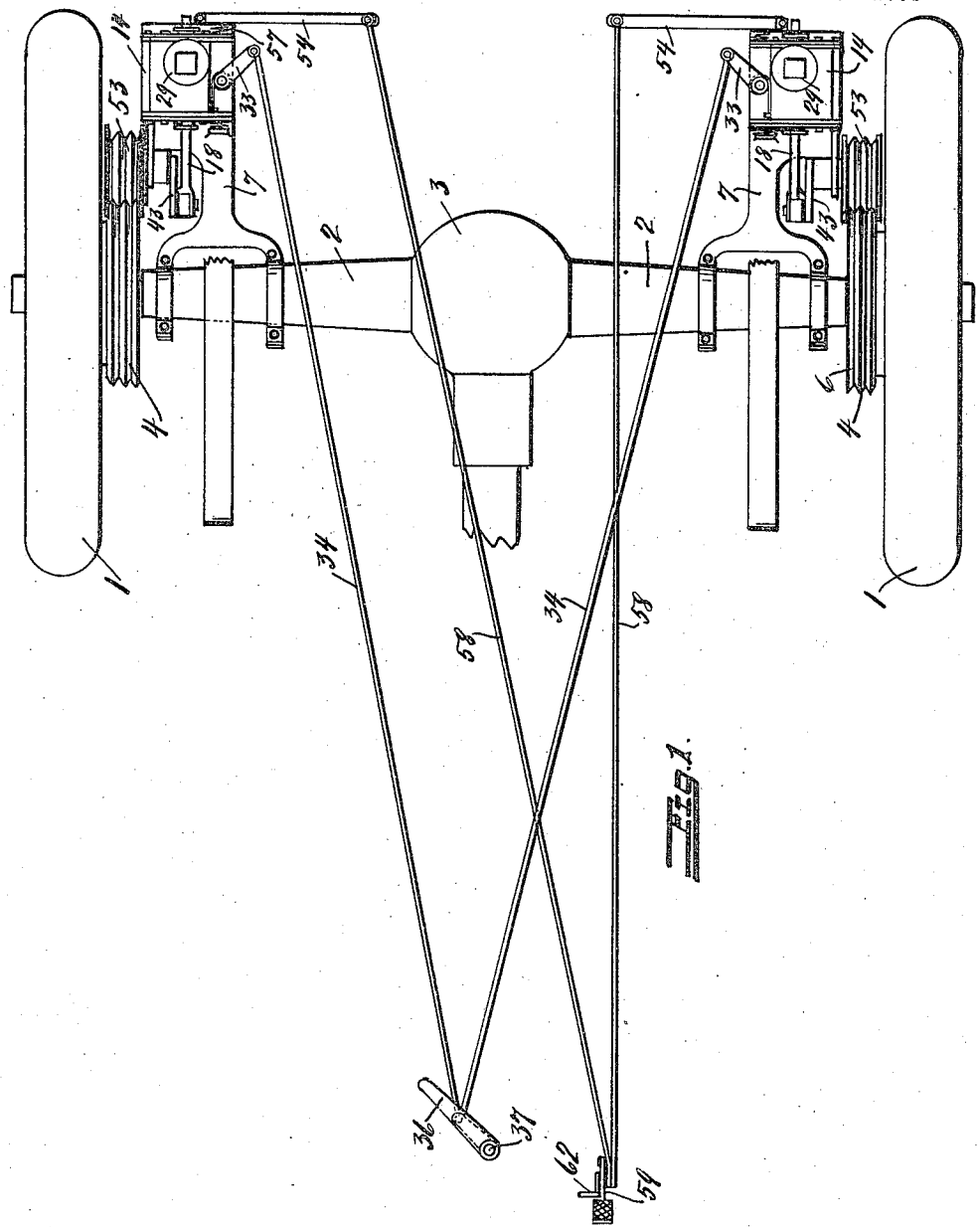

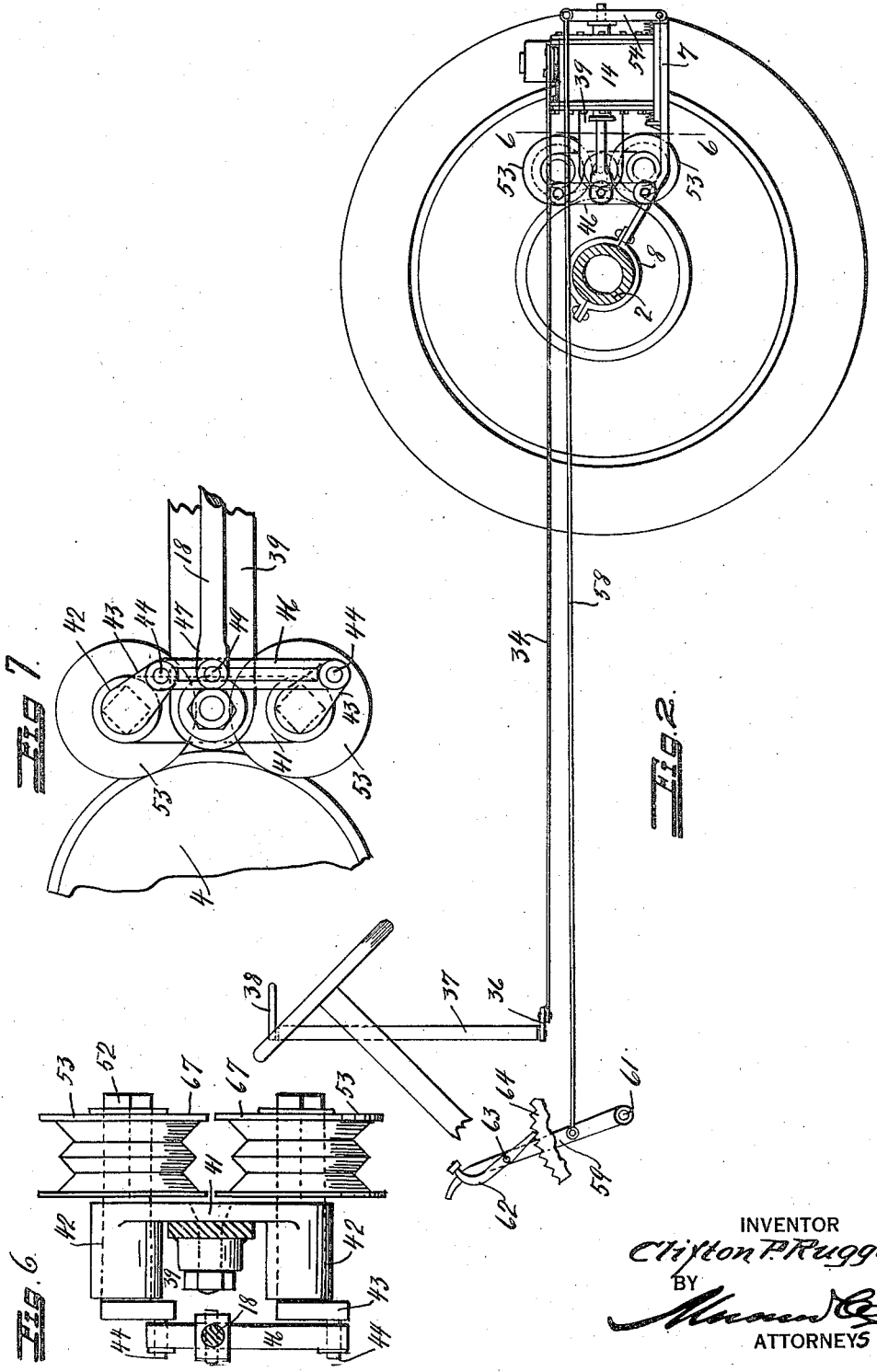

1,503,561

UNITED STATES PATENT OFFICE.

CLIFTON P. RUGGLES, OF McCLOUD, CALIFORNIA.

BRAKE.

Application filed May 7, 1923. Serial No. 637,301.

*To all whom it may concern:*

Be it known that I, CLIFTON P. RUGGLES, a citizen of the United States, and a resident of McCloud, county of Siskiyou, and State of California, have invented a new and useful Brake, of which the following is a specification.

The present invention relates to improvements in brakes and its particular object is to provide a brake for a motor vehicle that is particularly adapted to be used when the motor vehicle is coasting down a grade. Brakes as used at the present time do not lend themselves readily to this use since a partial application of the brake for the purpose of merely slowing down usually causes the lining of the brake to burn. The driver of a motor vehicle at the present time, therefore, usually resorts to the use of the engine as a brake by causing the rear wheels to drive the engine, whereby a certain brake effect is obtained. My brake mechanism makes the use of the engine for this purpose unnecessary and allows any degree of retarding effect to be applied by the brake mechanism itself. My mechanism at the same time is adapted to effect a stop and to operate in the same manner as any other brake.

The preferred form of my invention is illustrated in the accompanying drawing in which Figure 1 shows a plan view of the rear wheel arrangement of a motor vehicle with my brake mechanism attached thereto; Figure 2 an elevation of my brake mechanism as applied to the rear wheel of a motor vehicle; Figure 3 a horizontal section through a pump forming part of my brake mechanism; Figure 4 a vertical section through a portion of the pump; Figure 5 a rear view of the same; Figure 6 an enlarged detail view of a mechanism operatively connecting the brake drum with the pump as viewed from line 6—6 of Figure 2; and Figure 7 a side view of the latter mechanism.

While I have shown only the preferred form of the invention, it should be understood that various changes and modifications may be made within the scope of the claims hereto attached without departing from the spirit of the invention.

In Figure 1 is shown the general rear wheel arrangement of a motor vehicle comprising the two rear wheels (1), the axle housing (2), the housing (3) for the differential and the brake drums (4). The latter drums are rigidly secured to the rear wheels and rotate with the same. They are preferably provided exteriorly with annular grooves (6) in the manner shown in the drawing.

In operative proximity to each brake drum is mounted a platform (7) preferably secured to the rear axle housing by means of brackets (8). The platform has secured thereon a plate (9) of somewhat smaller dimensions with flanges (11) turned inwardly as shown at (12) to form a guideway for flanges (13) extending laterally from the pump (14) which allows the latter pump to slide longitudinally on its support.

The construction of the pump is shown in detail in Figures 3 and 4, from which it appears that the pump comprises a cylinder (16) having a piston (17) reciprocating therein. The latter is actuated by means of an axial shaft (18) supported in the end walls (19) of the cylinder. Packing glands (21), forcing a packing (22) into close engagement with the shaft, prevent any liquid within the cylinder from leaking out. The opposite ends of the cylinder are connected by means of a by-pass (23) which allows a liquid within the cylinder to move back and forth from one end to the other as the piston reciprocates. The port area of this by-pass is controlled by means of a valve (24), which when opened allows the liquid to circulate freely while it prevents the flow of liquid altogether when it is closed. In intermediate positions it retards the flow of liquid. When the valve is closed and prevents the liquid from circulating, the piston cannot reciprocate and will, therefore, stop the device actuating it, which will be described later.

The pump housing is preferably filled with light oil and is provided with a reservoir (26) communicating with the cylinder through a port (27) and a valve (28). The reservoir may be closed by means of a cap (29). To fill the cylinder oil is poured into the reservoir and runs through the valve (28) and the port (27) into the cylinder. Any leakage that may occur during the operation of the pump is compensated for by the entry of new oil from the reservoir while the valve (28) prevents the oil from flowing back into the reservoir when the piston might otherwise force it that way. A vent (31) may be closed by means of a plug (32).

The valve (24) is actuated by means of an arm (33), which latter is pivotally engaged by one end of a rod (34) leading forwardly and engaged at its other end by an arm (36) on a vertical shaft (37) provided with a handle (38). The latter handle is within convenient reach of the driver so that the latter may operate the valve from his seat.

One side of the pump has fixed thereto a forwardly extending plate (39) to the front end of which is pivotally supported a rocker (41) supporting in each arm a horizontal shaft (42) terminating interiorly in a crank (43). The crank pins (44) supported in the ends of the two cranks are connected by a slotted member (46) straddled by the forked end (47) of the shaft (18) with a pin (49) extending through the slot. The exterior ends of the shafts (42) are squared as shown at (52) and have grooved pulleys (53) thereon adapted to engage the groove in the brake drum when the pump is pushed forward in its guideway.

The pump is actuated by means of a lever (54) pivoted to the plate (9) as shown at (56) and bearing on a spring (57) disposed between the lever and the pump. From the free end of the lever extends a rod (58) secured with its other end to the brake lever (59) disposed near the front seat and pivoted to a stationary transverse rod (61). Any suitable means may be provided for holding the lever (59) in a certain position, as for instance, the foot pedal (62) pivoted to the lever at (63) and engaging with its point a toothed sector (64). A spring (66) tends to push the pump in the opposite direction so as to cause the pump to return when the brake is released.

The operation of the device may be described as follows:

When the lever (59) is advanced by the driver the pump is pushed forward so that the grooved pulleys (53) engage with the brake drum. It might be stated here that the pulleys are provided with flanges (67) which always remain in engagement with the brake drum. The frictional engagement between the two pulleys and the brake drum causes the former to rotate and this rotary motion is utilized to reciprocate the shaft (18) through the cranks (43) and the slotted member (46). The reciprocating shaft (18) causes the piston (17) to reciprocate within the cylinder (16) and the piston causes the oil within the cylinder to flow through the by-pass from one end to the other. As long as the valve (24) is fully open only little resistance is occasioned by the pump arrangement. But if the valve is closed no circulation can take place, the piston is prevented from reciprocating and on its part prevents the pulleys (53) from rotating, which latter through their frictional engagement with the brake drum prevent the latter from rotating and thus stop the motor vehicle. The principal advantage of the brake mechanism is that the resistance offered by the pump may be controlled at the will of the driver. If the latter wishes to coast down grade he can set the valve to offer any desired degree of resistance to the advance of the car, which allows the driver to proceed at any speed desired without using his engine for a brake and without injuring the brake lining of the ordinary type of brake. The brake mechanism ordinarily employed on the inside of the brake drum need not be disturbed by my arrangement. When the driver desires to discontinue the brake action he need only release the foot lever (59) when the spring (66) will return the pump to an inactive position.

Particular attention is called to the spring (57) interposed between the pump and the lever (54) which allows of a certain amount of play of the pump relative to the brake drum and is adapted to take up sudden shocks and jerks so that the latter are absorbed without necessitating an adjustment of the levers operated by the driver.

As a further detail it might be mentioned, that the valve (24) is provided with a spring (68) tending to return the valve to a normal position irrespective of the particular position of the pump. When the valve is in a normal position and the pump is pushed forward, there would be a tendency to change the position of the valve since the frictional resistance of the valve would not be sufficient to overcome the inertia of the rod (34) and its operating mechanism. For this purpose the spring is provided and it always holds the valve in a normal position no matter whether the pump is in an advanced or in a rearward position.

I claim:

1. A brake for a revolving element, comprising a slidably mounted pump having a piston therein, a rocker associated therewith having pulleys rotatable in its arms adapted to frictionally engage the revolving element when the pump is advanced and an operative connection between the pulleys and the piston causing the latter to reciprocate when the pulleys are rotated.

2. A brake for a revolving element, comprising a slidably mounted pump having a piston therein, a rocker associated therewith having pulleys rotatable in its arms adapted to frictionally engage the revolving element when the pump is advanced and an operative connection between the pulleys and the piston causing the latter to reciprocate when the pulleys are rotated, comprising cranks associated with the pulleys, a slotted member connecting the free end of the cranks and a connecting rod pivoted to the piston having means associated with its free end adapted to ride in the slot.

3. A brake for a revolving element, comprising a slidably mounted pump having a piston therein, a rocker associated therewith having pulleys rotatable in its arms adapted to frictionally engage the revolving element when the pump is advanced, an operative connection between the pulleys and the piston causing the latter to reciprocate when the pulleys are rotated and means for controlling the resistance offered by the pump.

4. A brake for a revolving element, comprising a slidably mounted pump having a piston therein, a rocker associated therewith having pulleys rotatable in its arms adapted to frictionally engage the revolving element when the pump is advanced, an operative connection between the pulleys and the piston causing the latter to reciprocate when the pulleys are rotated, a circulating system associated with the pump and means for controlling the port area of the circulating system.

5. In a brake pump of the character described, a cylinder having a piston reciprocating therein, a by-pass between the opposite ends of the cylinder and a valve for controlling the port area of the by-pass.

6. In a brake pump of the character described, a cylinder having a piston reciprocating therein, a by-pass between the opposite ends of the cylinder allowing a liquid medium to flow back and forth, a valve for controlling the port area of the by-pass and means for filling the cylinder comprising a reservoir on top of the cylinder having a valved communication with the same and a cap for closing the reservoir.

7. A brake for a motor vehicle comprising a brake drum associated with one of the wheels, a pump mounted slidably in operative proximity thereto having a rotary member for actuating the same adapted to frictionally engage the brake drum when the pump is advanced, and means adapted to be operated from the driver's seat for moving the pump.

8. A brake for a motor vehicle comprising a brake drum associated with one of the wheels, a pump mounted slidably in operative proximity thereto having a rotary member for actuating the same adapted to frictionally engage the brake drum when the pump is advanced, means for controlling the resistance offered by the pump, and means adapted to be operated from the driver's seat for moving the pump and for actuating the resistance control.

9. A brake for a motor vehicle comprising a brake drum associated with one of the wheels, a pump mounted slidably in operative proximity thereto having a rotary member for actuating the same adapted to frictionally engage the brake drum when the pump is advanced, means for controlling the resistance offered by the pump, a foot pedal operatively associated with the pump for moving the same and a hand lever near the steering wheel operatively connected to the resistance control for actuating the same.

CLIFTON P. RUGGLES.